United States Patent [19]
Hudson et al.

[11] Patent Number: 5,946,347
[45] Date of Patent: Aug. 31, 1999

[54] LOW LATENCY TRANSPORT OF SIGNALS IN AN ERROR CORRECTING DATA MODEM

[75] Inventors: Michael Hudson, Portland, Oreg.; Daniel L. Moore, Vancouver, Wash.

[73] Assignee: Diamond Multimedia Systems Inc., San Jose, Calif.

[21] Appl. No.: 08/655,834

[22] Filed: May 31, 1996

[51] Int. Cl.⁶ .................... H04B 1/38; H04L 5/16
[52] U.S. Cl. ........................... 375/222; 370/229
[58] Field of Search .................. 375/222; 370/229, 370/237, 465, 468, 493, 444, 455, 411, 412, 418, 416; 395/200.6, 200.65

[56] References Cited

U.S. PATENT DOCUMENTS

| | | | |
|---|---|---|---|
| 4,899,333 | 2/1990 | Boediger | 370/60 |
| 4,924,456 | 5/1990 | Maxwell et al. | 370/32 |
| 4,937,844 | 6/1990 | Kao | 375/122 |
| 4,977,582 | 12/1990 | Nichols et al. | 375/118 |
| 5,012,489 | 4/1991 | Burton et al. | 375/8 |
| 5,384,780 | 1/1995 | Lomp et al. | 370/94.1 |
| 5,473,604 | 12/1995 | Lorenz et al. | 370/60 |
| 5,612,953 | 3/1997 | Olnowich | 370/367 |
| 5,663,948 | 9/1997 | Kobunaya | 370/229 |
| 5,673,392 | 9/1997 | Nakashima et al. | 395/200.1 |
| 5,719,853 | 2/1998 | Ikeda | 370/229 |

*Primary Examiner*—Stephen Chin
*Assistant Examiner*—Mohammad Ghayour
*Attorney, Agent, or Firm*—Gerald B Rosenberg; Sarah Barone Schwartz

[57] ABSTRACT

The present invention is directed toward the low latency transport of signals demanding rapid communication. In modems utilizing an error-correcting protocol, messages are generally buffered and sent as a data packet. However, the method in accordance with the invention provides for transport of low latency messages without buffering or formation of a data packet, minimizing signal latency. In addition, modems operating in accordance with the invention maintain compatibility with other modems.

31 Claims, 5 Drawing Sheets

LOW LATENCY TRANSPORT OF SIGNALS IN AN ERROR CORRECTING DATA MODEM

BACKGROUND OF THE INVENTION

1. Field of Invention

The invention relates to modem signal transport, and particularly to high-speed transport of low latency signals.

2. Description of Related Art

Often when computers are at remote locations with respect to one another, modems are commonly used to transport signals between computers. However, in order to effectively communicate, modems, like humans, must speak the same language. Such language is known as a protocol. If a sending modem uses a different protocol from a receiving modem, the modems are incompatible and cannot communicate with one another. One of the most commonly used protocols is the V.42 recommendation (also referred to herein as the V.42 protocol), which has been adopted by several modem industry groups, particularly the International Telecommunications Union (ITU), formerly the Consultative Committee in International Telegraphy and Telephony (CCITT), to permit the development of compatible error-correcting modems. Other protocols have also been adopted by the ITU, particularly, protocols for non-error-correcting modems.

As suggested above, modems can generally be described as falling into one of two categories, error-correcting and non-error-correcting. Error-correcting modems are advantageous over non-error-correcting modems in that error-correcting modems filter out many errors on an incoming signal, which are often due to noise or other problems.

Generally, in the operation of an error-correcting modem, data received by a modem from a host system passes through a host system interface and is placed in a transmit data buffer, generally on a first-in, first-out (FIFO) basis. When the buffer is full, or when a buffer latency timer times out, the data is compressed and encoded and then sent to a receiving modem as a data packet, generally in accordance with the V.42 protocol. On receipt of the data packet, an error-correcting modem checks the entire data packet for errors, decompresses and decodes the data. Data is sent to a receive data buffer, and then ultimately transported to the receiving host system.

The general data transport method described above inherently adds a latency (or delay) factor to the transmitted data. That is, data is not transmitted from the sending modem until the transmit data buffer is full (or until a buffer latency timer times out) and the data is compressed. Data received at a receiving modem does not get transmitted to the receiving host system until the data is 1) checked for errors, 2) decompressed, and then 3) removed from the receive data buffer, which also generally operates on a FIFO basis.

While such buffered signal transport is suitable in many situations, some applications require faster transport, e.g., computer games that require "twitch", or rapid response, of players. For instance, in a fighting game where two players use separate computers at remote locations with respect to each other but both view the same images on their respective screens, player-one may punch, requiring player-two to block the punch. The timing of punch-block moves is critical to game play. If player-one's punch signal takes too long (or has too much latency) in reaching player-two, player-two may not have adequate time to react with a block. Essentially, too much latency in such "twitch" signals causes games to become disassociated and unplayable.

To minimize this latency problem, some applications recommend using non-error-correcting modems. While non-error-correcting modems will have a lower latency because error-correcting functions are eliminated, these modems still buffer the data at both the sending and receiving ends, continuing to cause unacceptable latency of "twitch" signals. Further, use of non-error-correcting modems is disadvantageous because errors due to noise on the lines will not be corrected and thus signals may be distorted or even nonsensical.

In extreme cases to eliminate latency, some modem designers have gone so far as to develop modems outside of any established standard protocol (i.e., no V.x protocol is utilized). While such modems may avoid "twitch" signal latency, gains in "twitch" transport are made at the expense of modem compatibility. In other words, signal transport without use of a standard protocol requires the same type of modem, i.e., the same modem brand and/or model, at both the sending and receiving ends. Such compatibility sacrifice is generally unacceptable.

Therefore, it is desirable to develop a modem that can quickly transport "twitch", or low latency, signals and still operate within an established error-correcting protocol.

SUMMARY OF THE INVENTION

The present invention is directed to the low latency transport of signals demanding rapid communication. It is desirable to rapidly transport "low latency" messages and to do so in a way that maintains modem compatibility.

A method in accordance with the invention is disclosed and first comprises providing a sending modem which operates in accordance with a standard error-correcting protocol. The modem generally sends data in data packets by receiving a message, buffering the message, waiting until the buffer is full or until a buffer latency timer times out, and transmitting the buffer contents in a data packet. However, if a message demands rapid transfer (i.e., it is a "low latency" message), the modem will engage in a low latency message transmission by receiving the low latency message, aborting any data packets in transmission, and then transmitting the low latency message. The transmission of data packets and low latency messages is each performed in conformance with a standard error-correcting protocol.

A modem operating in accordance with the invention can also receive low latency messages and transfer such messages to its host system interface, and ultimately to the host system, without additionally buffering the data.

The method in accordance with the invention is advantageous in that it allows low latency message transmission with minimized latency, while maintaining modem compatibility and error-correcting functions.

BRIEF DESCRIPTION OF THE DRAWINGS

The present invention is described with respect to particular embodiments thereof, and reference will be made to the drawings in which.

DETAILED DESCRIPTION OF THE INVENTION

Figure 1:
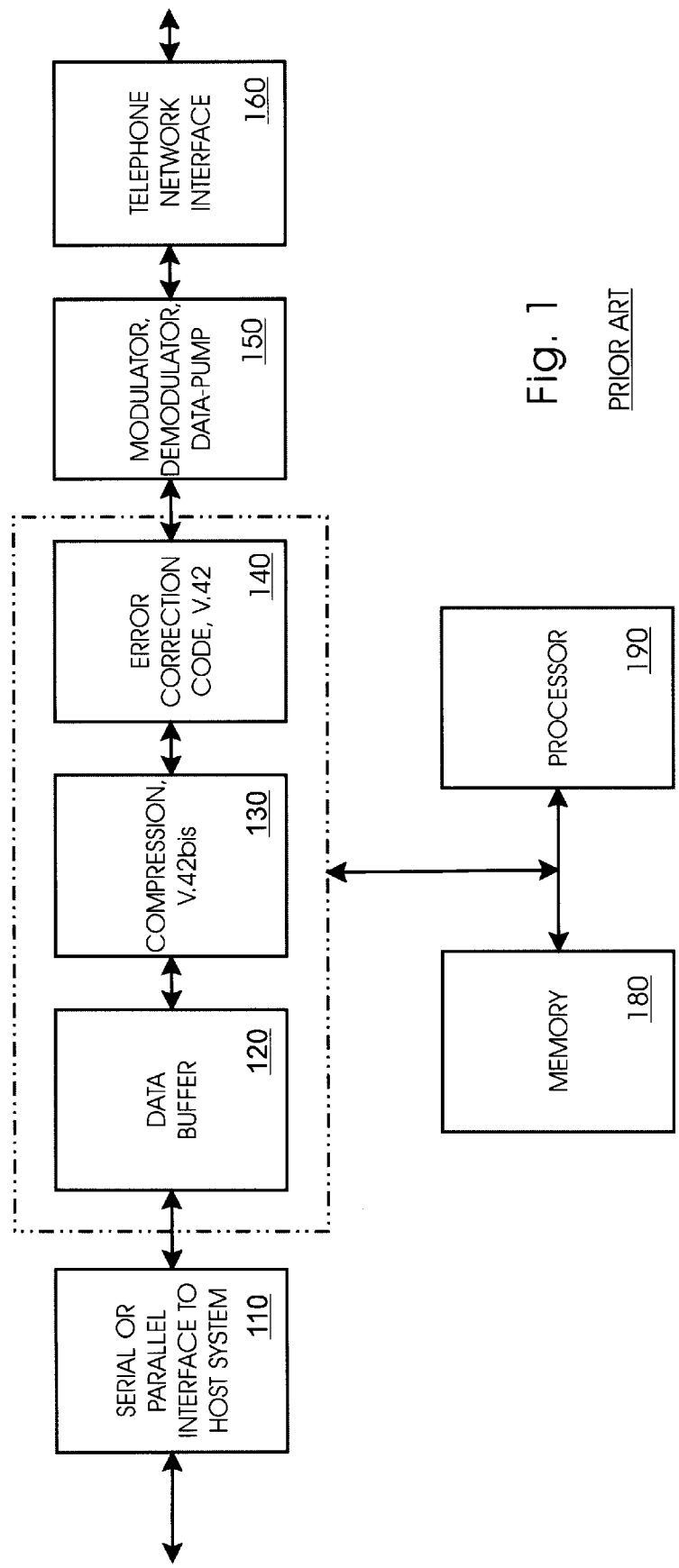
FIG. 1 is a generalized block diagram of a modem.

In accordance with the invention, a method of transporting "twitch," short, or other signals demanding fast transport (herein referred to as "low latency messages") is disclosed. Such method allows low latency message transport within the boundaries of a standard error-correcting protocol, maintaining modem compatibility even with modems which are not capable of low latency messaging.

An embodiment of the invention will be described with respect to the V.42 recommendation developed and/or standardized by the ITU. The V.42 recommendation of the ITU (ITU-T Recommendation V.42, March 1993, printed in Geneva, Switzerland and available from Global Engineering Documents, Englewood, Colo., 800-624-3974) is herein incorporated by reference. Currently this protocol is the modem industry standard error-correcting protocol and known to those of skill in the art. However, specifics of the protocol will be discussed where necessary. Further, it is to be understood that modems may support several different protocols and that the invention could be utilized with and/or embodied in modems utilizing error-correcting protocols other than the V.42 protocol.

Generally, the data-path followed in an error-correcting modem can be described with reference to FIG. 1. A host system interface 110 is coupled to a host system (not shown). The host system interface 110 can be parallel or serial. The host system interface 110 is coupled to data buffer 120, which in turn is coupled to compression block 130. Compression block 130 may be designed in accordance with the V.42bis protocol (a compression protocol used in conjunction with V.42). Compression block 130 is coupled to error-correction block 140, which may be designed in accordance with the V.42 error-correcting protocol. Error-correction block 140 is coupled to modulator/demodulator/datapump 150, which in turn is coupled to telephone network interface 160. The dotted line surrounding blocks 120, 130 and 140 indicates that any or all of these blocks can be implemented as hardware, software, and/or firmware. In the case of software and/or firmware, a memory 180 and a processor 190 will generally be utilized to carry out stored instructions.

The path shown in FIG. 1 can run in either direction: from host system interface 110 to network interface 160, if data is to be transmitted, or from network interface 160 to host system interface 110, if data is received from another modem. The same hardware/software can be used for both sending and receiving functions, or the hardware/software supporting each of the sending and receiving functions can be segregated.

Figure 2:
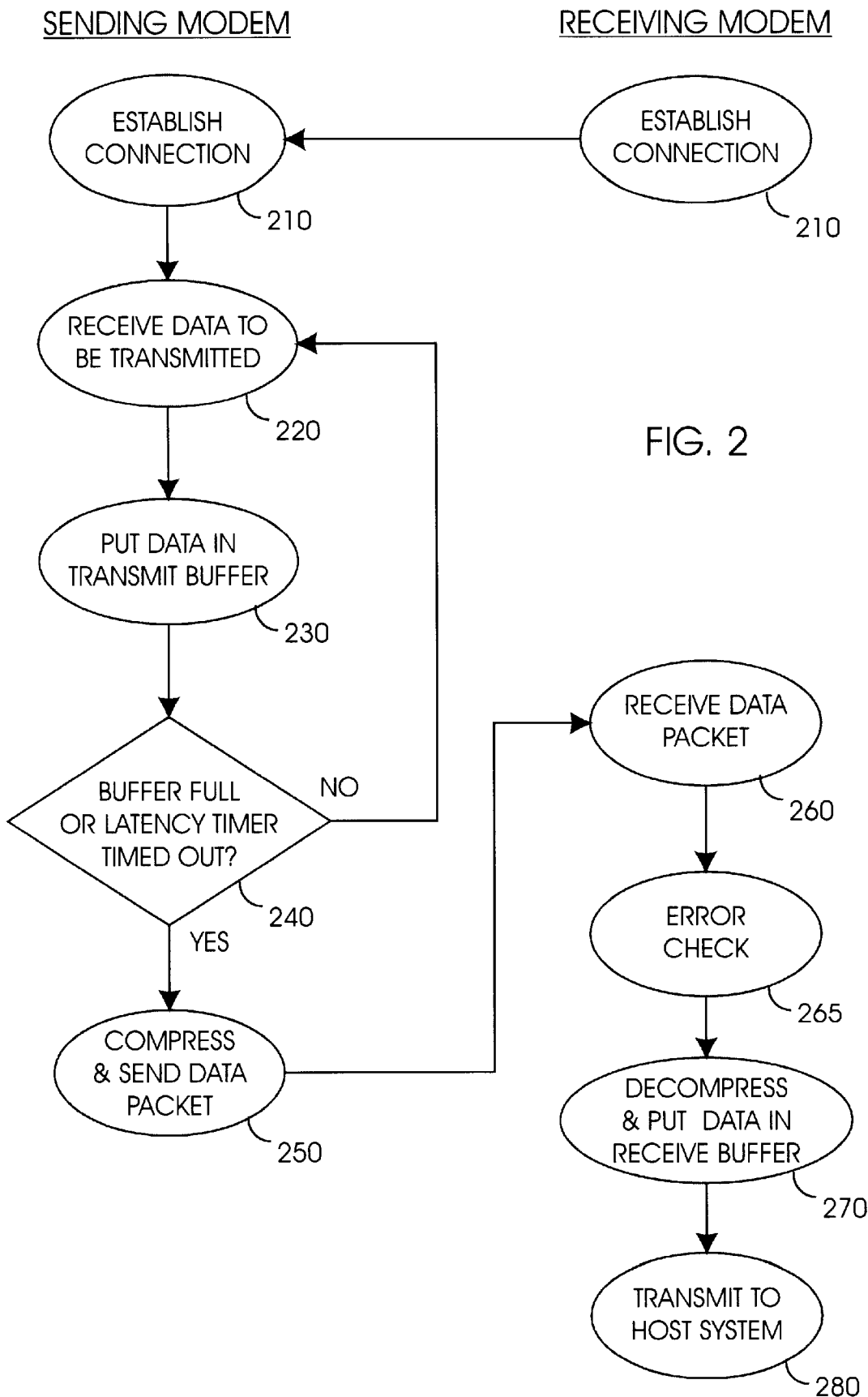
FIG. 2 is a flow diagram of the steps utilized to communicate information from a sending modem to a receiving modem.

With reference to FIG. 2, general error-correcting modem operation is described as follows. Before any data can be sent, a connection between a sending modem and a receiving modem must be established, step 210. In establishing a connection there are generally two phases: 1) physical connection establishment, and 2) protocol establishment. Establishing a physical connection is generally known to those of skill in the art and will not be further described. Once the physical connection is established, the protocol establishment phase is entered in which phase the modem determines the receiving modem type (error-correcting or non-error-correcting), any necessary parameter values, and any optional procedures. Such protocol establishment is well described in the V.42 recommendation of the ITU.

Once the connection is established, then data transfer can commence. Typically, in most modems which operate in accordance with the V.42 error-correcting protocol, data to be sent is received from a sending host system by the host system interface, step 220, and then buffered in a FIFO transmit buffer, step 230. If the transmit buffer is not full or a buffer latency timer has not timed out, step 240, the process returns to step 220 to await receipt of more data. When the transmit buffer is full or when a buffer latency timer times out, step 240, the data in the buffer is compressed by compression block 130 (FIG. 1) and encoded (put in V.42 format) by error-correction block 140 (FIG. 1), and sent to the receiving modem, step 250.

Upon receipt of the data packet by the receiving modem, step 260, the data is checked for errors, step 265. The packet is then decoded, decompressed and placed into a receive data buffer, step 270, which is typically a first-in first-out (FIFO) type buffer. The data is finally transmitted, one octet (one byte) at a time, on a FIFO basis, to the receiving host system, step 280. Thus, if a low latency message is desired to be sent, delay (latency) will occur in the data buffer loop at the sending modem, steps 220–240, when the data is compressed, step 250, when the data is checked for errors at the receiving modem, step 265, and when the data is decompressed and rebuffered at the receiving modem, step 270.

Figure 3:
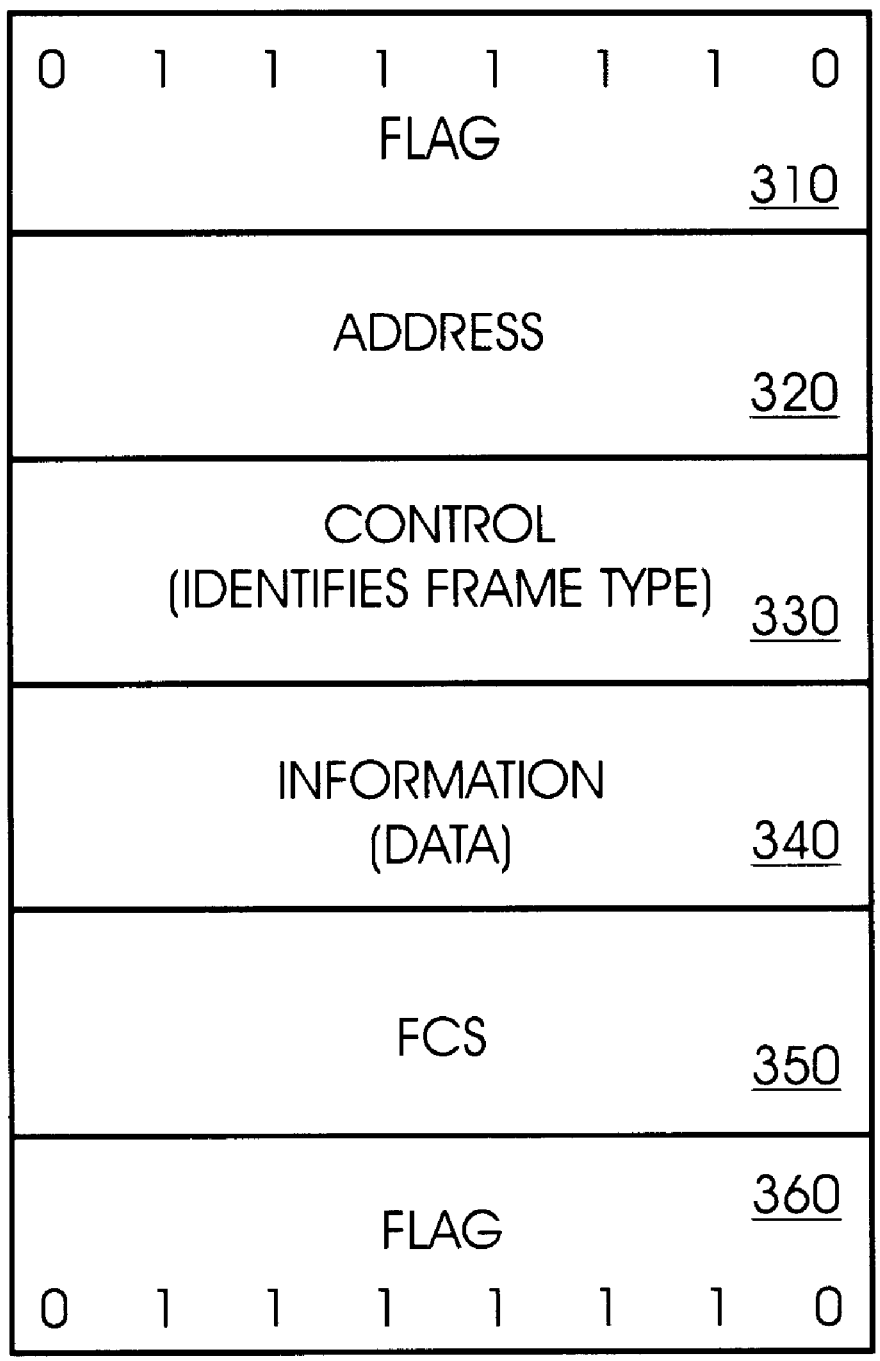
FIG. 3 is a representational diagram of the generic frame structure used by the V.42 protocol.

Generally, in communication between modems, data, commands and other information are transmitted in a structure called a frame. FIG. 3 shows a generic V.42 frame. Such a frame contains an opening flag field 310, an address field 320, a control field 330, an information field 340, a frame check sequence (FCS) field 350 and a closing flag field 360. The flag fields, 310 and 360, delimit the frame by using a predetermined unique bit pattern, "01111110." The address field 320 generally identifies the error-correcting connection and the error-correcting entity associated with the connection. The FCS field 350 is used to guard against bit errors in transmission. The control field 330 is generally used to distinguish between different frame types (e.g., information frames, supervisory frames, and unnumbered frames). The information field 340 is the field into which the data or command information is inserted. In the V.42 protocol, the information field size defaults to 128 octets in length (an octet is 8 bits).

Generally, different frame types are used to send different types of information. Information frames are used to send buffered data packets. Supervisory frames are used to transmit control information. Unnumbered frames are used to transmit additional information (data, control signals) but are not used for general data packet transmission. Information and supervisory frames are generally given sequence numbers, but unnumbered frames are not. The sequence numbers aid in keeping track of data transmitted and/or received.

Thus, in FIG. 2, step 250, the data is taken from the transmit buffer 120 (FIG. 1), compressed by block 130 (FIG. 1), and encoded by block 140 (FIG. 1) into a V.42 information frame. Once the buffered data is encoded in V.42 information frame format, the information frame is sent to the receiving modem.

Figure 4:
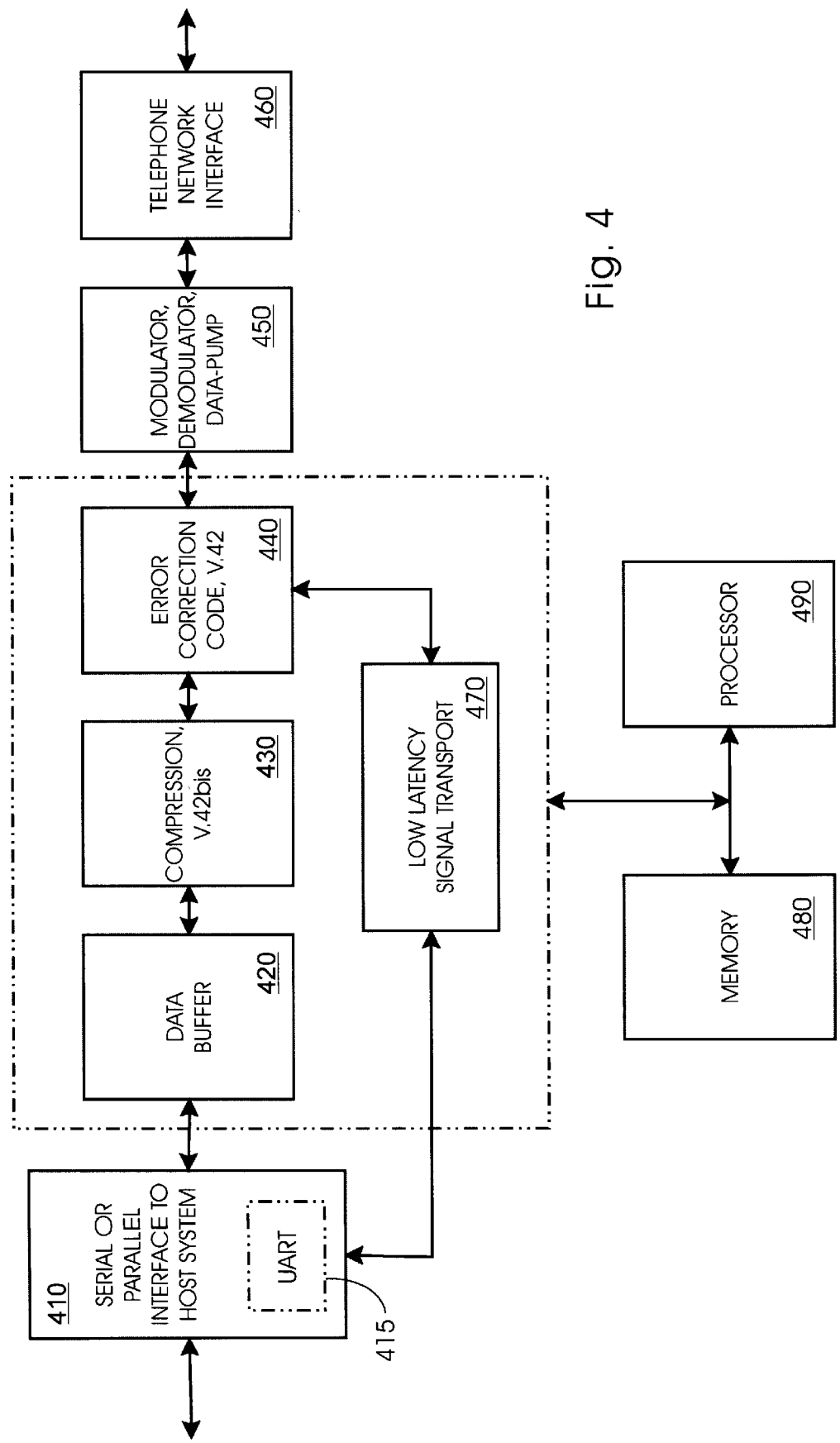
FIG. 4 is a generalized block diagram of a modem operating in accordance with the present invention.

To avoid the latency that occurs with data buffering and in accordance with the invention, the same general data path as is conventionally used is utilized in an embodiment of the invention to maintain modem compatibility and is shown in FIG. 4. That is, a parallel or serial modem interface 410 is coupled to a host system (not shown). Host system interface 410 is coupled to a data buffer 420 which in turn is coupled to compression block 430. Compression block 430 is coupled to error-correction block 440. Error-correction block 440 is coupled to modulator/demodulator/datapump 450 and finally to telephone network interface 460. In addition, a low latency signal transport mechanism 470 is added, coupled to interface 410, bypassing data buffer 420 and compression block 430, and coupled to error-correction block 440. The dotted line surrounding blocks 420, 430, 440 and 470 indicates that in various embodiments of the invention any or all of these blocks can be implemented as hardware, firmware, and/or software. In the case of software and/or firmware utilization, a memory 480 and a processor 490 will be generally utilized to execute stored instructions.

Also note that similar to FIG. 1, the data path in FIG. 4 can run in either direction: from host system interface 410 to network interface 460 or vice versa, depending on whether data is being transmitted to or received from a second modem. Further, transmit and receive functions can be implemented together, with the same hardware/software, or separately, with distinct hardware/software for each function.

Figure 5:
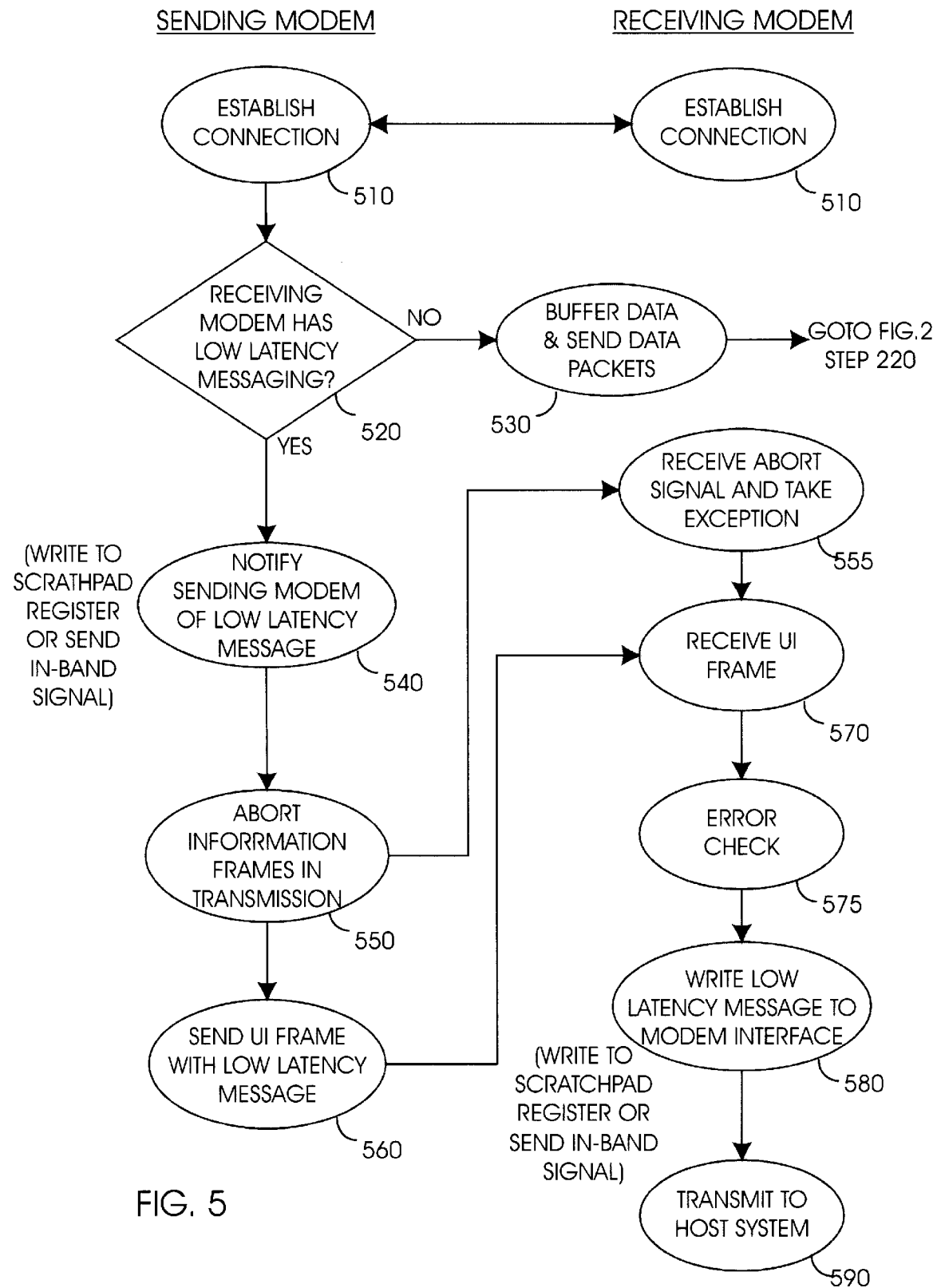
FIG. 5 is a flow diagram of the steps utilized to communicate information from a sending modem to a receiving modem in accordance with one embodiment of the invention.

In accordance with the invention, and in reference to FIG. 5, the general steps followed by a modem capable of low latency signal transport (or low latency messaging) are shown. The modem will establish a connection with a receiving modem similar to that done conventionally and in accordance with the V.42 protocol, step 510. However, during the protocol establishment phase, an optional low latency messaging procedure will be negotiated. During negotiation, the sending modem determines whether the receiving modem is also capable of receiving low latency messages, step 520. The details of optional procedure negotiations are well documented in the V.42 recommendation. Generally, however, such a procedure entails a request to engage in an identified procedure and a response agreeing/disagreeing to such request.

Note, that while negotiating an optional procedure often occurs in the protocol establishment phase of establishing a connection, in some embodiments of the invention and as indicated by the dotted line between steps 510 and 520, low latency messaging may not be required immediately upon establishing a connection between the sending and receiving modem. Thus, it need not be determined during the initial protocol establishment whether the receiving modem is capable of low latency messaging. For instance, once a connection is established, conventional buffered signal transport, as discussed with reference to FIG. 2, may take place for some time. Then, upon being notified that low latency messaging is required by the sending host system, the sending modem could determine whether the receiving modem is capable of low latency messaging by attempting to negotiate an optional procedure with the receiving modem. Such later procedure negotiation is supported in the V.42 recommendation.

If, in step 520, it is determined that the receiving modem is incapable of low latency messaging, then the sending modem will engage in conventional buffered data packet transmission, step 530 as was discussed with reference to FIG. 2 and in accordance with the V.42 protocol. If, however, the receiving modem is capable of low latency messaging, then, in step 540, if a low latency message is pending, the modem is notified of the message by the host system's writing the low latency message to the modem interface. If the modem has a parallel interface, then the low latency message is written, in one embodiment of the invention, to a register in the interface. In one embodiment of the invention, where a UART device 415 (FIG. 4) is used as part of a parallel data modem interface, the register to which the low latency message is written is a scratchpad register. One UART with a scratchpad register is National Semiconductor's™ 16450 or 16550. In a 16550 compatible UART, the scratchpad register is located at address offset 6.

Alternatively, if the modem is connected to the host system through a serial interface, the use of a scratchpad register will not be available. In such a case, the modem should be notified of a pending low latency message by using standard methods of in-band signaling. In in-band signalling, the sending device and receiving device establish that a particular character will act as an escape character and that everything following that character will be treated specially until another escape character arrives or until a designated number of bits has passed. Thus, in accordance with one embodiment of the invention, once a designated escape character arrives at the interface, the bits immediately following the escape character are interpreted as a low latency message. In one embodiment of the invention where the modem utilizes a serial interface, a DLE signal is used as the in-band signal. A DLE signal is an 8-bit signal used in serial communications to indicate an escape from data mode.

Upon being notified of a pending low latency message in step 540, by either receiving the message in a register or receiving an in-band signal, if the sending modem was engaging in conventional buffered data packet transfer, as described in FIG. 2, the sending modem will abort any data packets/information frames in transmission, step 550. In the V.42 recommendation, an abort signal is generally a stream of ones (7 or more contiguous 1-bits). Upon receipt of an abort signal, the receive modem flushes, aborts, disregards or otherwise discards any frames currently being received, and an exception at the receiving modem is caused, step 555.

Generally, buffered data is kept until an acknowledgement signal is received by the sending modem from the receiving modem. However, when a transmission is aborted, no acknowledgement signal is received. Thus, the aborted data is not lost and can be resent at a later time.

In one embodiment of the invention, in the frame abort recovery sequence, the receiving modem is instructed to watch for a subsequent frame containing a low latency message. Such a procedure speeds up the recovery process and avoids secondary parsing, which entails determining the type of frame received and how to handle the frame.

After the sequence of ones have been sent in the abort sequence, a series of flags are sent to the receiving modem, which, in one embodiment, is three flags. Flags are generally used as a synchronization tool and indicate that a frame will be forthcoming. (In fact, flags are generally sent between frames under the V.42 protocol.) After sending the flag series, the sending modem sends the low latency signal, in step 560, to the receiving modem, however it does so within the contours of the V.42 protocol by encoding the low latency message with block 440 (FIG. 4) in a V.42 unnumbered information (UI) frame, one type of unnumbered frame. The receiving modem, in its frame recovery sequence, will receive the UI frame and check for errors, steps 570 and 575. The message is decoded (the data is extracted from the V.42 frame) and the message is written to the host system interface, step 580. If the modem has a parallel interface, as in one embodiment of the invention, the message is written to a register in the interface. Such a register, in one embodiment, is a scratchpad register in an interface UART. Alternatively, in step 580, if the receiving modem has a serial host system interface, a standard in-band signal escape identifier, such as a DLE signal, can be sent to the host system interface of the receiving modem. The low latency message is then transmitted to the receiving host system, step 590.

Thus, a method of transporting low latency signals within the confines of the established V.42 error-correcting protocol has been described. It should be noted that a low latency message can be an 8-bit, 16-bit, 32-bit, or other size message.

A system operating in accordance with the invention eliminates latency due to data buffering and compression and is advantageous in that it allows fast "twitch" signals to be sent with a minimum of latency in both parallel and serial interface modems. The invention has the further advantage that it is compatible with modems that do not engage in low latency messaging. For instance, in one embodiment of the invention, step 520 in FIG. 5 is bypassed and the sending modem does not determine whether the receiving modem is capable of low latency messaging, e.g., by negotiating an optional procedure. Nonetheless if the sending modem sends a low latency message as described above, a receiving modem that receives such a message, but is incapable of low latency messaging, will simply ignore and discard the UI frame containing the low latency message as an invalid frame, in accordance with the V.42 recommendation.

It should be understood that the particular embodiments described above are only illustrative of the principles of the present invention, and various modifications could be made by those skilled in the art without departing from the scope and spirit of the invention. Thus, the scope of the present invention is limited only by the claims that follow.

What is claimed is:

1. A method of communication between a sending modem and a receiving modem in accordance with an error-correcting protocol, said sending modem engaging in the transmission of data packets subject to said error-correcting protocol, wherein data is collected in a packet buffer pending transmission in a data packet subject to a packet buffer full or latency time out condition, comprising the steps of:

a) receiving, by said sending modem, a low latency message;
   b) interrupting the transmission of any current data packet in response to receipt of said low latency message; and
   c) transmitting, by said sending modem, said low latency message without waiting for said packet buffer full or latency time out condition.

2. The method of claim 1, further comprising the steps of:
   identifying a low latency mode of operation;
   receiving, by said sending modem, a reply to said step of identifying;
   selectively enabling said low latency mode of operation in response to said reply.

3. The method of claim 1, wherein said low latency message is a partial data packet.

4. The method of claim 1, wherein step (a) includes receiving said low latency message in a register in a host system interface.

5. The method of claim 1, wherein step (a) includes receiving an in-band signal escape identifier in a host system interface.

6. The method of claim 1, further comprising the steps of:
   receiving, by said sending modem, a second low latency message in a network interface.

7. The method of claim 6, wherein said step of receiving said second low latency message includes transferring said low latency message to a host system interface.

8. The method of claim 7, wherein said step of transferring said low latency message to a host system interface includes transferring said low latency message to a register in said host system interface.

9. The method of claim 7, wherein said step of transferring said low latency message to a host system interface includes transferring an in-band signal escape identifier to said host system interface.

10. A method of communication between a sending modem and a receiving modem in accordance with a V.42 error-correcting protocol, said sending modem engaging in the transmission of data packets subject to said V.42 error-correcting protocol, wherein data is collected in a packet buffer pending transmission in a data packet subject to a packet buffer full or latency time out condition, comprising the steps of:

a) negotiating an optional procedure in accordance with said V.42 error-correcting protocol, including:
      1) identifying a low latency mode of operation;
      2) receiving, by said sending modem, a reply to said step of identifying; and
      3) selectively enabling said low latency mode of operation in response to said reply;
   b) engaging in a low-latency-message transmission, including the steps of:
      1) receiving, by said sending modem, a low latency message in a host system interface;
      2) interrupting the transmission of any current data packet in response to receipt of said low latency message;
      3) transmitting, by said sending modem, said low latency message in a V.42 unnumbered information frame without waiting for said packet buffer full or latency time out condition.

11. The method of claim 10, wherein said low latency message is a partial packet.

12. The method of claim 10, wherein step (b) (1) includes receiving a low latency message in a register.

13. The method of claim 10, wherein step (b) (1) includes receiving an in-band signal escape identifier.

14. The method of claim 10, wherein step (b) (2) is in accordance with said V.42 error-correcting protocol abort procedure and includes sending a string of one's and at least one flag.

15. The method of claim 10, further comprising the steps of:
   receiving, by said sending modem, a second V.42 unnumbered information frame containing a second low latency message in a network interface.

16. The method of claim 15, further comprising the steps of:
   checking said unnumbered information frame for errors; and
   transferring said second low latency message to said host system interface.

17. The method of claim 16, wherein said step of transferring said low latency message to said host system interface includes placing said low latency message in a register in said host system interface.

18. The method of claim 16, wherein said step of transferring said low latency message to said modem interface includes transmitting an in-band signal escape identifier to said host system interface.

19. A method of communication between a sending modem and a receiving modem in accordance with an error-correcting protocol, said receiving modem engaging in the receipt of data packets subject to said error-correcting protocol, wherein data is extracted from a received data packet and placed into a packet buffer, comprising the steps of:

a) receiving a data packet abort signal;

b) receiving a low latency message;

c) transmitting said low latency message to a host system interface, without placing said low latency message in said packet buffer.

20. The method of claim 19, wherein step (c) includes transferring said low latency message to a register in said host system interface.

21. The method of claim 19, wherein step (c) includes transmitting an in-band signal escape identifier to said host system interface.

22. The method of claim 19, wherein step (b) includes receiving a V.42 unnumbered information frame.

23. A modem having a host system interface, a network interface, a packet buffer and an error-correcting module, said modem capable of engaging in communication comprising the steps of:

1) operating in a data packet mode of operation including the steps of:

a) receiving data in a host system interface;

b) collecting data received in step (1)(a) in a packet buffer pending transmission as a data packet subject to a buffer full or latency time out condition;

c) encoding, after said buffer full or latency time out condition occurs, said data packet with said error-correcting module in accordance with an error-correcting protocol;

d) transferring said data packet to said network interface for transmission to a receiving entity;

2) operating in a low latency mode of operation, including the steps of:

a) receiving a low latency message in said host system interface;

b) interrupting the transmission of said data packet in response to receipt of said low latency message;

c) encoding said low latency message with said error-correcting module in accordance with an error-correcting protocol, without waiting for said packet buffer full or latency time out condition to occur; and d) transferring said low latency message to said network interface for transmission to said receiving entity.

24. The modem of claim 23, further capable of engaging in the step of negotiating an optional procedure in accordance with said error-correcting protocol, including a) identifying said low latency mode of operation;

b) receiving a reply to said step of identifying; and c) selectively enabling said low latency mode of operation in response to said reply.

25. The modem of claim 23, wherein said error-correcting protocol is a V.42 error-correcting protocol, and wherein:

the step of encoding said data packet with said error-correcting module includes placing said data packet in a V.42 information frame format; and the step of encoding said low latency message with said error-correcting protocol includes placing said low latency message in a V.42 unnumbered information frame format.

26. The modem of claim 23, wherein the step of receiving said low latency message in said host system interface includes receiving said low latency message in a register in said host system interface.

27. The modem of claim 23, wherein the step of receiving said low latency message in said host system interface includes receiving an in-band signal escape identifier in said host system interface.

28. The modem of claim 23, further capable of engaging in the steps of:

receiving a second low latency message in said network interface.

29. The modem of claim 28, wherein the step of receiving said second low latency message includes transferring said second low latency message to said host system interface.

30. The modem of claim 29, wherein the step of transferring said second low latency message to said host system interface includes transferring said low latency message to a register in said host system interface.

31. The modem of claim 29, wherein the step of transferring said second low latency message to said host system interface includes transferring an in-band signal escape identifier to said host system interface.

* * * * *